US006257366B1

(12) United States Patent
Gerretsen et al.

(10) Patent No.: US 6,257,366 B1
(45) Date of Patent: Jul. 10, 2001

(54) EXHAUST DEVICE FOR A TURBINE ENGINE

(75) Inventors: Jurriaan Gerretsen, Fontainebleau (FR); Yvette Gertrude Roman, Meteren; Everhardus Gerretsen, Delft, both of (NL)

(73) Assignee: Nederlandse Organisatie voor Toegepast-Natuurwetenschappelijk Onderzoek, Delft (NL)

( * ) Notice: Subject to any disclaimer, the term of this patent is extended or adjusted under 35 U.S.C. 154(b) by 0 days.

(21) Appl. No.: 09/029,989

(22) PCT Filed: Sep. 12, 1996

(86) PCT No.: PCT/NL96/00358

§ 371 Date: Jul. 20, 1998

§ 102(e) Date: Jul. 20, 1998

(87) PCT Pub. No.: WO97/10426

PCT Pub. Date: Mar. 20, 1997

(30) Foreign Application Priority Data

Sep. 13, 1995 (NL) .................................................. 1001183

(51) Int. Cl.⁷ ................................. F01N 1/02; F02K 1/00
(52) U.S. Cl. ........................... 181/213; 181/286; 181/294
(58) Field of Search ...................................... 181/213, 222, 181/286, 290, 292, 294, 250, 252, 256, 258

(56) References Cited

U.S. PATENT DOCUMENTS

| 3,996,145 | | 12/1976 | Hepburn . | |
|---|---|---|---|---|
| 4,104,426 | * | 8/1978 | Gonzalez et al. | 181/294 |
| 4,269,800 | | 5/1981 | Sommer et al. . | |
| 4,503,128 | | 3/1985 | Iseli et al. . | |
| 5,594,216 | * | 1/1997 | Yasukawa et al. | 181/213 |
| 5,895,897 | * | 4/1999 | Oishi et al. | 181/286 |

FOREIGN PATENT DOCUMENTS

| 1054421 | 1/1967 | (GB) . |
|---|---|---|
| 2025925 | 1/1980 | (GB) . |

* cited by examiner

*Primary Examiner*—Khanh Dang
(74) *Attorney, Agent, or Firm*—Bachman & LaPointe, P.C.

(57) ABSTRACT

The invention relates to an exhaust device for a turbine engine, comprising a liner made of a fiber-reinforced ceramic matrix composite. The liner is preferably fitted some distance away from the inside of the exhaust section. The liner has a thickness of 1 to 10 mm, preferably of 2 to 6 mm. There is a gap of at least 10 mm, preferably 10 to 40 mm, between the liner and the inside of the exhaust.

13 Claims, 2 Drawing Sheets

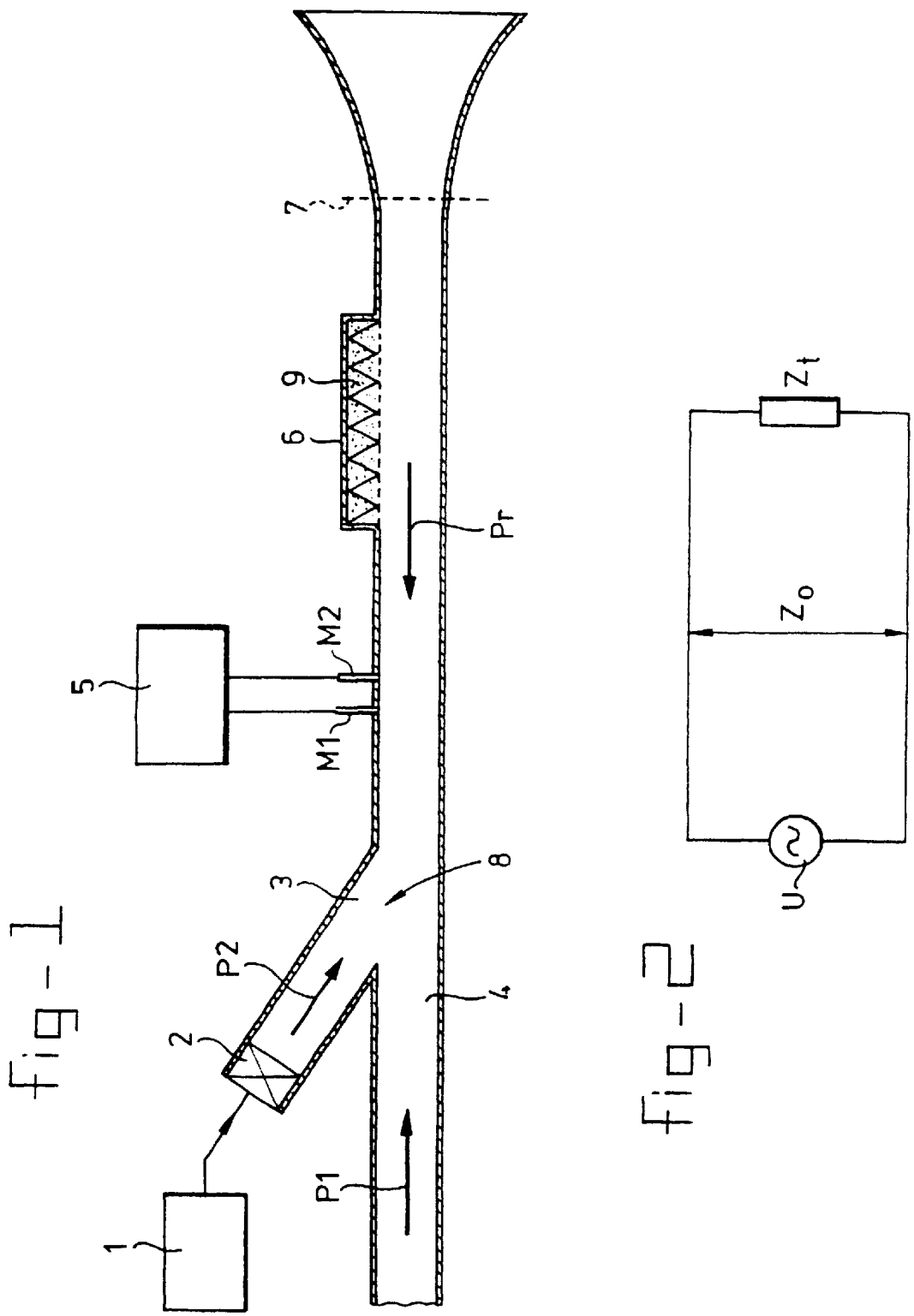

EXHAUST DEVICE FOR A TURBINE ENGINE

BACKGROUND OF THE INVENTION

The invention relates to an exhaust device for a turbine engine.

Turbine engines, for example turbine engines for aircraft, produce a high noise intensity level, which is a quantity of sound which is measured in decibels (dB). A high noise intensity level not only pollutes the environment but is also disadvantageous for the degree of loading of aircraft. After all, the higher the degree of loading, the greater the power which has to be supplied by the turbine engines, which results in a high and sometimes an unacceptable noise intensity level.

A reduction in the noise intensity level of turbine engines is effected, inter alia, by means of a special construction of the turbine engine. Thus, in modern turbine engines only a small portion of the incoming air stream flows through the combustion chambers. The major portion of the incoming air stream is diverted. This diverted air stream rejoins the exhaust gases in the exhaust section. Because, as a result of the high flow rate, the diverted air stream is essentially a turbulent air stream, this results in a reduction in the noise intensity level which is caused by the outgoing air stream from the turbine engine. Nevertheless, a further reduction in the noise intensity level is desirable.

The noise intensity level of turbine engines can also be reduced by fitting a noise-damping material, for example perfolin, in the inlet section of a jet engine. In this case the reduction in the noise intensity level is achieved by so-called quench interference, that is to say the sound waves which penetrate into the sound-damping material extinguish one another by interference. However, these noise-damping materials are not suitable for use in the exhaust section of turbine engines because they are not able to withstand the thermal and mechanical stresses which prevail in the exhaust section. Although noise-damping materials are known which are able to withstand such stresses, these materials have the disadvantage that they are too heavy for use in aviation.

Although some ceramic materials, such as foams, are known which possess noise-damping characteristics, monolithic, ceramic materials of this type have the disadvantage that they have too low a resistance to fatigue and brittle fracture characteristics.

SUMMARY OF THE INVENTION

The aim of the invention is, therefore, to provide a material with which the noise intensity level of an engine, in particular of a turbine engine, can be reduced at the exhaust side of said engine. The invention therefore relates to an exhaust device for an engine which comprises a liner made of a fibre-reinforced ceramic matrix composite.

The engine can be an internal combustion engine, for example a petrol engine or a diesel engine, but also a turbine engine. The turbine engine can be for stationary applications, for example a turbine engine or a gas turbine for energy-generating installations, or a turbine engine for an aircraft, for example a turbo-propeller engine. The engine can also be a portable internal combustion engine, such as those used in hand-held power saws, motor mowers and the like.

The fibre-reinforced ceramic matrix composite has good noise-damping properties and is well able to withstand thermal and mechanical stresses.

According to the invention it is preferable that the liner, which comprises the fibre-reinforced ceramic matrix composite, is enclosed within the exhaust device in such a way that the liner is fitted some distance (d) away from the inside of the exhaust section of the engine. In this case no contact transfer of noise can occur and a maximum reduction in the noise intensity level is achieved.

Contact transfer of noise is understood to be transfer of sound waves from one material to another material, the transfer taking place because the two materials are in contact with one another.

From the economic standpoint, and, in particular, to restrict the increase in the weight of the engine, which is especially important in the case of turbine engines for aircraft in connection with the usable loading capacity of the aircraft, it is advantageous to fit a thin liner. According to the invention, a liner which has a thickness of 1 to 10 mm, in particular 2 to 6 mm, is preferably fitted.

According to the invention it is also preferable that there is a gap, in which air, exhaust gases and the like can be present or through which the latter can flow, between the liner, which comprises the fibre-reinforced ceramic matrix composite, and the inside of the exhaust section. Said gap must be sufficiently large because otherwise appreciable transfer of sound can take place by radiation of sound waves, with the result that it is not possible to achieve optimum reduction of the noise intensity level. The gap between the fibre-reinforced ceramic matrix composite and the inside of the exhaust section makes an important contribution to the reduction in the noise intensity level irrespective of the transfer of sound through the wall of the exhaust section. According to a preferred embodiment of the invention, the gap between the liner and the inside of the exhaust section is at least 10 mm, preferably 10 to 40 mm.

The liner, which comprises the fibre-reinforced ceramic matrix composite, can be fitted as a whole. However, if the liner is very large in size or if it is desirable to fit a relatively thick liner, it is preferable, according to the invention, to fit a liner which is made up of segments or sections of the fibre-reinforced ceramic matrix composite in the exhaust section. Another advantage of a liner consisting of sections is that fitting thereof is simpler. Furthermore, local damage or worn spots in the liner can be repaired simply by replacing one or more damaged or worn sections by new sections.

The sections made of the fibre-reinforced ceramic matrix composite can be of circular, oval, rectangular or square shape. According to a preferred embodiment, the components are cylindrical. The components can, for example, be in the shape of a tile.

The invention also relates to a fibre-reinforced ceramic matrix composite for reducing the noise intensity level of turbine engines, in particular of turbine engines for aircraft.

The composite comprises fibres, which are woven, knitted, stitched or cemented to one another, and a matrix of a ceramic material. In a preferred embodiment of the invention, the composite has a fibre content of 20 to 60% by vol. and a matrix content of 10 to 30% by vol.

The composite according to the invention can be produced by using known processes. Said processes can take place in the gas phase or liquid phase, optionally combined with a solid phase. An example of a gas phase process is chemical vapour infiltration. Processes which take place in the liquid phase are, for example, melt impregnation, sol-gel impregnation and immersion techniques. A review of suitable processes is given, for example, in Y. G. Roman, "Toepassingen van keramische matrixcomposieten als functionele en structurele componenten" ("Applications of ceramic matrix composites as functional and structural components"), Materialen, 29 (1995), pp. 29–36.

The fibre-reinforced ceramic matrix composite according to the invention must be porous in order to achieve a substantial reduction in the noise intensity level. The composite preferably has an open porosity of 40 to 70% by vol., where the open porosity is the ratio of the open pore volume to the total composite volume, a gas permeability of $1^{-14}$ to $10^{-9}$ m$^2$ and a tortuosity of 1 to 6. For this purpose the open porosity was measured by means of helium pycnometry or by means of the Archimedes method (provisional standard NVN-ENV 1389 (1995)), the gas permeability by Darcy's method, which is described in R. E. Collins, "Flow of fluids through porous materials", Reinhold Publ. Corp., New York, Ed. R. Wilke, (1961), and the tortuosity by a method described by P. C. Carman, Trans. Inst. Chem. Eng. London, 15 (1937), p. 150.

The fibre-reinforced ceramic matrix composite according to the invention has a density of, preferably, less than 8 kg/dm$^3$, which is advantageous for applications in aviation.

The material from which the fibres and the matrix of the composite according to the invention are produced is not of essential importance for the sound-damping effect of the composite. The fibres can, for example, be produced from carbon, oxides, carbides, nitrides, borides or mixtures thereof, said oxides, carbides, nitrides, borides or mixtures thereof containing magnesium, aluminium, silicon, the elements from groups III, IV, V, VI, VII and VIII or mixtures thereof. The matrix can, for example comprise any ceramic or carbon-containing material, such as materials which are produced from carbon, oxides, carbides, nitrides, borides or mixtures or compounds thereof, said oxides, carbides, nitrides, borides or mixtures thereof containing magnesium, aluminium, silicon, the elements of groups III, IV, V, VI, VII and VIII or mixtures or compounds thereof. Examples of such materials contained in the matrix are silicon carbide and aluminium oxide. According to a preferred embodiment of the invention, the fibres are carbon fibres and the matrix comprises silicon carbide as the ceramic material.

The fibre-reinforced ceramic matrix composite can be protected against corrosion by, for example, oxygen, water or corrosive exhaust gases such as hydrocarbons, carbon dioxide, sulphur dioxide and nitrogen oxides, by coating the composite with a layer of a corrosion-resistant material. Preferably, the composite according to the invention is coated with one or more layers or a multi-layer of carbon, silicon carbide, silicon nitride, boron nitride, aluminium oxide, silicon oxide, titanium nitride, titanium diboride, yttrium oxide, zirconium oxide or mixtures or compounds thereof. The composite according to the invention is, in particular, coated with one or more layers or a multi-layer of silicon carbide.

The fibre-reinforced ceramic matrix composite according to the invention contains a layer which is located between the fibres and the matrix. The purpose of this layer is to provide the composite material with a "tough" or plastically deformable deformation characteristic. The intermediate layer can be a layer of any suitable material, such as, for example, carbon, boron nitride, metallic layers (platinum, silicon, tungsten and the like), intermetallic layers, for example suicides, or another plastically deformable layer or layers or multi-layer. Said layers are about 0.1 to 1 micrometre thick; they can be porous and they envelop each individual fibre filament.

The fibre-reinforced ceramic matrix composite according to the invention can substantially reduce the noise intensity level within the frequency range from about 500 Hz to about 12 kHz. The greatest reduction takes place at frequencies to which the human ear is most sensitive. Said frequencies comprise the range from about 500 Hz to about 8 kHz. The greatest reduction, that is to say more than 50%, in the noise intensity level is achieved in the frequency range from about 2 to 7 kHz. In the frequency range from 3 to 5 kHz the reduction in the noise than 80%.

BRIEF DESCRIPTION OF THE DRAWINGS

The invention will be explained with reference to, inter alia, a drawing, in which:

FIG. 1 shows a measurement set-up for measuring the absorption coefficient of the fibre-reinforced ceramic materials according to the invention;

FIG. 2 shows a simplified substitute electrical circuit for the set-up according to FIG. 1;

DETAILED DESCRIPTION

Figure 3:
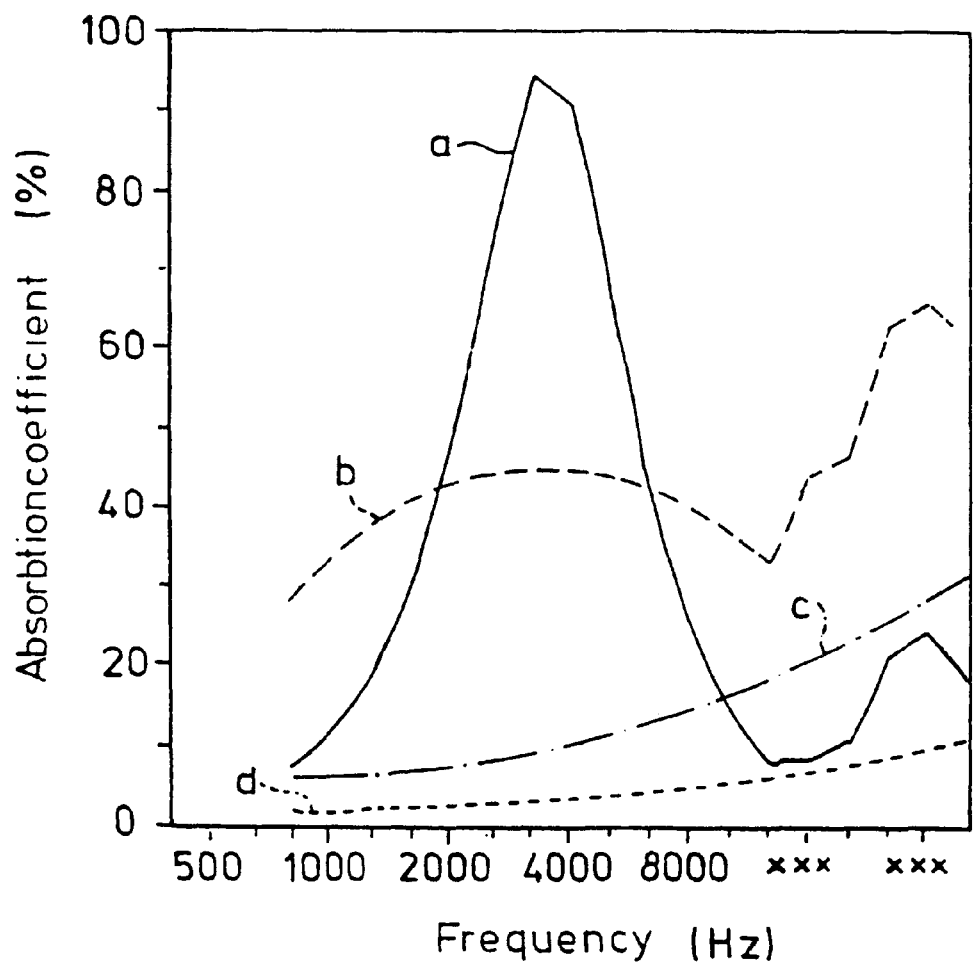
FIG. 3 shows the absorption coefficient of various fibre-reinforced ceramic materials according to the invention as a function of the frequency on the basis of simulations, where lines a, b, c and d indicate the absorption coefficient as a function of the frequency at, respectively, $10^5$, $10^6$, $10^7$ and $10^8$ N.s/m$^4$.

In the possible measurement set-up according to FIG. 1, the reference numeral 1 indicates a noise generator. The noise generator 1 generates an electric noise signal, which is fed to a loudspeaker for conversion into a sound signal. The sound signal, indicated here by arrow P2, propagates in a section 3 of a rectangular or circular pipe 4.

The section 3 is connected to the pipe at point 8. As desired, a calm air stream, indicated here by P1, can propagate in the pipe 4, which air stream is added to the sound signal P2 at connection point 8.

Two microphones M1, M2 for receiving sound wave P2, which is propagating in pipe 4, are located downstream of connection point B. Microphones M1, M2 are connected to their signal processing unit 5 for processing the signals received by the microphones M1, M2.

Further downstream from the microphones M1, M2 there is a test section 6, in which the fibre-reinforced ceramic material 9 to be tested is located. A closure 7 for the pipe 4 is located downstream of the test section 6. If the above-mentioned calm air stream 1 is used, the closure 7 must be reflection-free, so that the calm air stream P1 is able to leave the pipe 4 without being reflected.

FIG. 2 shows a substitute electrical replacement circuit for the set-up according to FIG. 1. This circuit shows a power source U, which corresponds to the noise generator 1 and the sound source 2 in FIG. 1. The pipe 4 is represented by means of two leads with characteristic impedance $Z_o$, whilst the test section 6 from FIG. 1 is represented by an impedance $Z_t$ which terminates the leads.

During a test, the installation according to FIG. 1 functions as follows. The noise generator 1 generates a signal of arbitrary frequency content which is fed to the sound source 2, which converts this signal into sound signal P2. The sound signal P2 propagates through the section 3 towards the microphones M1, M2. With the aid of the set-up of two microphones M1, M2 arranged next to one another, it is possible to determine not only the intensity of the sound signal P2 but also the propagation direction, as will be clear to any acoustics expert. The signal processing unit 5 is used for processing.

The test section 6 now serves as a closure for pipe 4 with an impedance $Z_t$ which does not equal the characteristic impedance $Z_o$ of the pipe 4, as a result of which a portion $P_r$ of the sound signal P2 is reflected in a direction opposed to the direction of P2. The value of the impedance $Z_t$ depends on the fibre-reinforced ceramic material 9 chosen.

The intensity of the reflected sound signal $P_r$ can be measured by the microphones M1, M2 and, as a result of the use of two microphones M1, M2 placed alongside one another, the reflected sound signal $P_r$ can be separated from the sound signal P2.

The ratio between the intensity of the reflected sound signal $P_r$ and the intensity of the sound signal P2 is now a measure for the impedance $Z_t$ of the test section 6 and thus a measure for the absorption coefficient of the chosen fibre-reinforced ceramic material 9, which is located in the test section 6.

The reflection-free closure 7 prevents further reflections of the sound signal P2 being produced at the end of the pipe 4, which further intensities would be able to influence adversely the intensity of the reflected sound signal $P_r$.

FIG. 3 shows the dependence of the absorption coefficient of various fibre-reinforced ceramic materials on the frequency. FIG. 3 shows simulation data for fibre-reinforced ceramic materials for four different permeability values (or air-resistance values) of the fibre-reinforced ceramic material. Here the permeability value is expressed as (pressure drop over the sheet)/(gas speed×thickness of the sheet), in accordance with Darcy's law. The permeability value of the material can thus be changed as a function of, for example, the thickness of the sheet or the porosity of the material.

From FIG. 3 it can be seen, inter alia, that for a permeability value of $10^5$ N.s/m$^4$ (line a) an absorption coefficient of more than 80% can be expected in a large portion of the frequency range of interest.

What is claimed is:

1. In an engine having an exhaust section, an exhaust device connected to the exhaust section of the engine, the improvement comprises a liner enclosed in the exhaust device a distance from the exhaust section of the engine, the liner being formed of a fibre-reinforced ceramic matrix composite characterized by noise-damping properties and ability to withstand thermal and mechanical stresses wherein the distance (d) is sufficient to substantially eliminate contact transfer of noise and thereby achieve a reduction in noise intensity level.

2. Exhaust device according to claim 1, wherein the liner has a thickness of 1 to 10mm.

3. Exhaust device according to claim 1, wherein the gap between the liner and the inside of the exhaust is at least 10 mm.

4. Exhaust device according to claim 1, wherein the liner comprises sections made of fibre-reinforced ceramic matrix composite.

5. Exhaust device according to claim 1, wherein the fibre-reinforced ceramic matrix composite has a fibre content of 20 to 60% by vol. and a matrix content of 10 to 30% by vol.

6. Exhaust device according to claim 5, wherein the fibre-reinforced ceramic matrix composite has an open porosity of 40 to 70% by vol., a gas permeability of $10^{-14}$ to $10^{-2}$ m$^2$ and a tortuosity of 1 to 6.

7. Exhaust device according to claim 5, wherein the fibre-reinforced ceramic matrix composite has a density of less than 8 kg/dm$^3$.

8. Exhaust device according to claim 5, wherein the fibre-reinforced ceramic matrix composite has fibres which are carbon fibres and the ceramic matrix composite comprises silicon carbide.

9. Exhaust device according to claim 5, wherein the fibre-reinforced ceramic matrix composite is coated with a corrosion-resistant material.

10. Exhaust device according to claim 5, wherein the fibre-reinforced ceramic matrix composite is coated with silicon carbide.

11. Exhaust device according to claim 5, wherein the fibre-reinforced ceramic matrix composite has a layer located between the fibres and the matrix.

12. Exhaust device according to claim 1, wherein the liner has a thickness of 2 to 6 mm.

13. Exhaust device according to claim 1, wherein the gap between the liner and the inside of the exhaust is at least 10 to 40 l mm.

* * * * *